United States Patent
Kim et al.

(10) Patent No.: US 11,212,668 B2
(45) Date of Patent: Dec. 28, 2021

(54) DEVICE AND METHOD FOR PROVIDING UE RADIO CAPABILITY TO CORE NETWORK OF MOBILE COMMUNICATION SYSTEM

(71) Applicant: Samsung Electronics Co., Ltd., Suwon-si (KR)

(72) Inventors: Sunghoon Kim, Suwon-si (KR); Andrew Bennett, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/537,480

(22) Filed: Aug. 9, 2019

(65) Prior Publication Data
US 2020/0053554 A1 Feb. 13, 2020

(30) Foreign Application Priority Data

Aug. 10, 2018 (KR) .................. 10-2018-0093843
Nov. 6, 2018 (KR) .................. 10-2018-0135192
(Continued)

(51) Int. Cl.
*H04W 8/24* (2009.01)
*H04W 60/00* (2009.01)

(52) U.S. Cl.
CPC ............. *H04W 8/24* (2013.01); *H04W 60/00* (2013.01)

(58) Field of Classification Search
CPC ........ H04W 8/24; H04W 60/00; H04L 67/141
See application file for complete search history.

(56) References Cited

U.S. PATENT DOCUMENTS 10,104,583 B2    10/2018  Wang et al.
2018/0227871 A1*  8/2018  Singh ................ H04W 12/0608
                  (Continued)

FOREIGN PATENT DOCUMENTS

| KR | 10-2018-0023806 A | 3/2018 |
| KR | 10-1859582 B1 | 5/2018 |
| WO | 2018008980 A1 | 1/2018 |

OTHER PUBLICATIONS

Qualcomm, "Solution for how are the UE radio capabilities managed and signalled", Jul. 2-6, 2018, SA WG2 Meeting #128 S2-186551.*
(Continued)

*Primary Examiner* — Yuwen Pan
*Assistant Examiner* — Hung K Du

(57) ABSTRACT

The present disclosure relates to a pre-$5^{th}$-Generation (5G) or 5G communication system to be provided for supporting higher data rates in a Beyond $4^{th}$-Generation (4G) communication system such as Long Term Evolution (LTE). According to various embodiments, a network node in a wireless communication system may include: receiving, from an application function (AF) via a network exposure function (NEF), user equipment (UE) radio capability information on UE radio capability identifier (ID) and at least one UE radio capability mapping to the UE radio capability ID; receiving, from an access and mobility management function (AMF), a request for information on at least one UE radio capability mapping to a specific UE radio capability ID; and transmitting, to the AMF, the information on at least one UE radio capability mapping to the specific UE radio capability ID.

16 Claims, 8 Drawing Sheets

(30) Foreign Application Priority Data

Feb. 21, 2019 (KR) ........................ 10-2019-0020755
Apr. 25, 2019 (KR) ........................ 10-2019-0048730

(56) References Cited

U.S. PATENT DOCUMENTS

| | | | |
|---|---|---|---|
| 2019/0007500 A1* | 1/2019 | Kim | H04L 67/141 |
| 2019/0239064 A1* | 8/2019 | Stojanovski | H04W 36/0022 |
| 2019/0313239 A1* | 10/2019 | Horn | H04L 5/14 |
| 2019/0364541 A1 | 11/2019 | Ryu | |

OTHER PUBLICATIONS

3GPP TS 23.501 "3rd Generation Partnership Project; Technical Specification Group Services and System Aspects; System Architecture for 5G System; Stage 2 (Release 15)", V15.2.0 (Jun. 2018).*

ISA/KR, International Search Report and Written Opinion of the International Searching Authority, International Application No. PCT/KR2019/009673, dated Nov. 29, 2019, 8 pages.

3GPP TS 23.501 V15.2.0 (Jun. 2018), Technical Specification, 3rd Generation Partnership Project; Technical Specification Group Services and System Aspects; System Architecture for the 5G System; Stage 2 (Release 15), 216 pages.

LG Electronics, "Clarification on UE Capability Match Request procedure," S2-186584 (was S2-18xxxx), 3GPP TSG-SA WG2 Meeting #128, Vilnius, Lithuania, Jul. 2-6, 2018, 3 pages.

Nokia, et al., "Rapporteur's CR for TS38.410, R3-184386," 3GPP TSG-RAN WG3 NR AdHoc 1807, Montreal, Canada, Jul. 2-6, 2018, 7 pages.

Qualcomm Incorporated, "Solution for how are the UE radio capabilities managed and signalled," S2-186551 (was S2-18xxxx), SA WG2 Meeting #128, Vilnius, Lithuania, Jul. 2-6, 2018, 4 pages.

Vivo, "Introducing procedure for PLMN assigned Radio Capability ID", 3GPP TSG-SA2 Meeting #133, May 13-17, 2019, S2-1904952, 3 pages.

"3rd Generation Partnership Project; Technical Specification Group Services and System Aspects; Study on optimisations of UE radio capability signalling (Release 16)", 3GPP TR 23.743 V01.0 (Jul. 2018), 15 pages.

Supplementary European Search Report dated Jul. 2, 2021 in connection with European Patent Application No. EP 19 84 7633, 12 pages.

* cited by examiner

DEVICE AND METHOD FOR PROVIDING UE RADIO CAPABILITY TO CORE NETWORK OF MOBILE COMMUNICATION SYSTEM

CROSS-REFERENCE TO RELATED APPLICATIONS

This application is based on and claims priority under 35 U.S.C. 119 to Korean Patent Application No. 10-2018-0093843 filed on Aug. 10, 2018, Korean Patent Application No. 10-2018-0135192 filed on Nov. 6, 2018, Korean Patent Application No. 10-2019-0020755 filed on Feb. 21, 2019, and Korean Patent Application No. 10-2019-0048730 filed on Apr. 25, 2019 in the Korean Intellectual Property Office, the disclosures of which are herein incorporated by reference in their entireties.

BACKGROUND

1. Field

The disclosure generally relates to a mobile communication system and, more particularly, to a device and method for providing a UE radio capability to a core network in a mobile communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Accordingly, various attempts to apply the 5G communication to the IoT network are made. For example, technologies, such as a sensor network, machine to machine (M2M), and machine type communication (MTC), are implemented by techniques, such as beamforming, MIMO, and an array antenna. The application of a cloud RAN as the big data processing technology may be an example of convergence of the 5G technology and the IoT technology.

Along with the development of the mobile communication technology, as described above, when a UE radio capability increases, the size of information that may include the UE radio capability is increased. This affects the size of a message transmitted in a radio resource, and when the UE radio capability is not fully transmitted with one message, inefficiency of further utilizing the message of the radio resource occurs. Because a 5G radio system supports a greater number of band combinations and functions, it is anticipated that more types of radio capabilities will be expected, and inefficiencies will increase accordingly. Therefore, a measure for overcoming such inefficiency may be required.

SUMMARY

Based on the above discussion, the disclosure provides a device and method for enabling a core network to effectively recognize a UE radio capability in a mobile communication system.

According to various embodiments, a method for operating a network node in a wireless communication system may include: receiving, from an application function (AF) via a network exposure function (NEF), user equipment (UE) radio capability information on UE radio capability identifier (ID) and at least one UE radio capability mapping to the UE radio capability ID; receiving, from an access and mobility management function (AMF), a request for information on at least one UE radio capability mapping to a specific UE radio capability ID; transmitting, to the AMF, the information on at least one UE radio capability mapping to the specific UE radio capability ID.

According to various embodiments, a network node in a wireless communication system may include: a transceiver; and at least one processor operably coupled to the transceiver, and configured to: receive, from an application function (AF) via a network exposure function (NEF), user equipment (UE) radio capability information on UE radio capability identifier (ID) and at least one UE radio capability mapping to the UE radio capability ID; receive, from an access and mobility management function (AMF), a request for information on at least one UE radio capability mapping to a specific UE radio capability ID; and transmit, to the AMF, the information on at least one UE radio capability mapping to the specific UE radio capability ID.

A device and method according to various embodiments enables devices of a core network in a mobile communication system to efficiently recognize a UE radio capability.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments.

Hereinafter, various embodiments will be described based on an approach of hardware. However, various embodiments include a technology that uses both hardware and software and thus, the various embodiments may not exclude the perspective of software.

Hereinafter, the disclosure relates to a device and method for recognizing a UE radio capability by a core network in a mobile communication system. Particularly, the disclosure describes a technology for, in a mobile communication system, configuring association between a radio capability and a representative representation that expresses the radio capability, and allowing a core network to recognize the UE radio capability by using the representative representation, thereby reducing a loss of a resource for recognizing the UE radio capability by the core network.

Terms referring to a signal to be used, terms referring to a channel, terms referring to control information, terms referring to a message, terms referring to network entities, terms referring to elements of a device, and the like are illustrated for convenience of explanation. Accordingly, the disclosure is not limited to the following terms and other terms having the same technical meaning may be used.

The disclosure describes various embodiments by using terms used in some communication specifications (e.g., 3rd Generation Partnership Project (3GPP)), but this is merely illustrative. Various embodiments may also be easily modified and applied to other communication systems.

Figure 1:
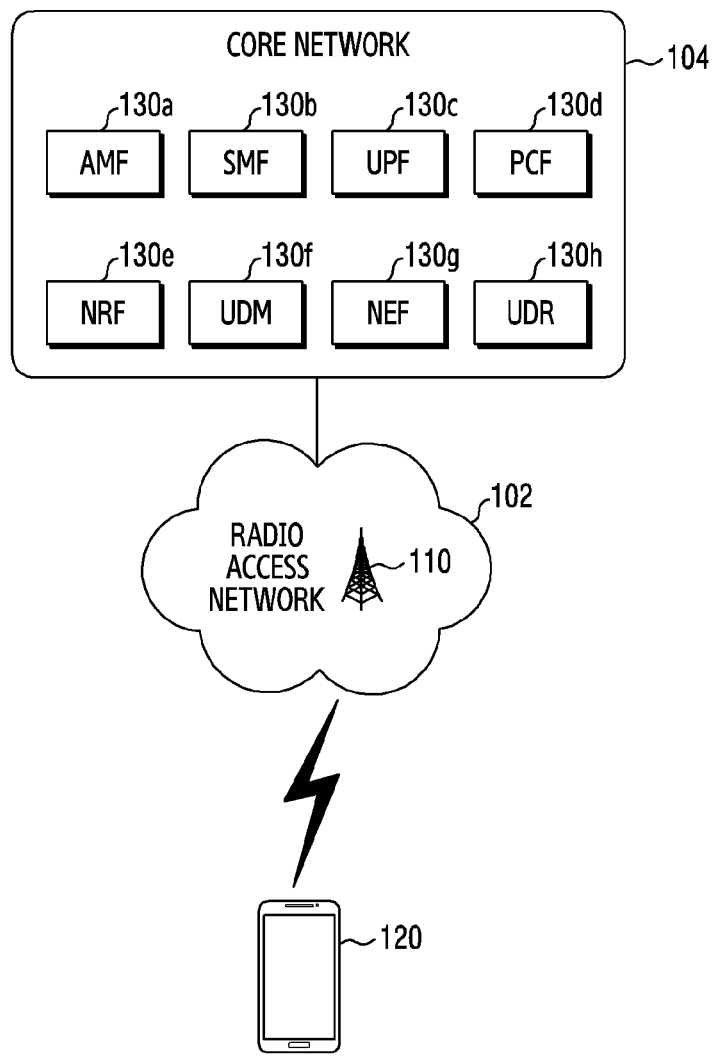
FIG. 1 illustrates a mobile communication system according to various embodiments.

FIG. 1 illustrates a mobile communication system according to various embodiments.

Referring to FIG. 1, the mobile communication system includes a Radio Access Network (RAN) 102 and a Core Network (CN) 104.

The radio access network 102 is a network directly connected to a user device, for example, a UE 120, and is an infrastructure that provides radio access to the UE 120. The radio access network 102 may include a set of multiple base stations including a base station 110, and may perform communication via interfaces established between the multiple base stations. At least some of the interfaces between the multiple base stations may be wired interfaces or wireless interfaces. The base station 110 may have a structure in which a Central Unit (CU) and a Distributed Unit (DU) are separated. In this case, a single CU may control multiple DUs. The base station 110 may be referred to as, in addition to a base station, an "Access Point (AP)", a "next generation Node B (gNB)", a "5th Generation (5G) node", a "wireless point", a "Transmission/Reception Point (TRP)", or other terms having equivalent technical meanings. The UE 120 may access the radio access network 102, and may perform communication with the base station 110 through a radio channel. The UE 120 may be referred to as, in addition to a terminal, a "User Equipment (UE)", a "mobile station", a "subscriber station", a "remote terminal", a "wireless terminal", a "user device", or other terms having equivalent technical meanings.

The core network 104 is a network that manages the entire system, which controls the radio access network 102 and processes data and control signals for the UE 120, which are transmitted or received via the radio access network 102. The core network 104 performs various functions, such as controlling a user plane and a control plane, processing mobility, managing subscriber information, charging, and interworking with other types of systems (e.g., a Long Term Evolution (LTE) system). In order to perform the described various functions, the core network 104 may include multiple functionally separated entities having different Network Functions (NFs). For example, the core network 104 may include an Access and Mobility Management Function (AMF) 130a, a Session Management Function (SMF) 130b, a User Plane Function (UPF) 130c, a Policy and Charging Function (PCF) 130d, a Network Repository Function (NRF) 130e, Unified Data Management (UDM) 130f, a Network Exposure Function (NEF) 130g, and an Unified Data Repository (UDR) 130h.

The UE 120 may be connected to the radio access network 102 and may access the AMF 130a that forms a mobility management function of the core network 104. The AMF 130a is a function or a device that is in charge of both access to the radio access network 102 and the mobility management of the UE 120. The SMF 130b is an NF to manage a session. The AMF 130a is connected to the SMF 130b, and routes a message relating to a session for the UE 120 to the SMF 130b. The SMF 130b is connected to the UPF 130c, allocates a user plane resource to be provided to the UE 120, and establishes a tunnel to transmit data between the base station 110 and the UPF 130c. The PCF 130d controls information related to a policy and charging for a session used by the UE 120. The NRF 130e stores information of NFs installed in a mobile communication service provider network, and performs a function to notify of the stored information. The NRF 130e may be connected to all NFs. When starting operation in a service provider network, each NF provides, to the NRF 130e, a notification that a corresponding NR is being operated in the network, by registration in the NRF 130e. The UDN 130f is an NF to perform a function similar to that of a Home Subscriber Server (HSS) in a 4G network, and stores subscription information of the UE 120 or a context used by the UE 120 in the network.

The NEF 130g performs a function to connect a 3rd party server and an NF in the 5G mobile communication system. Also, the NEF 130g performs a function to provide data to the UDR 130h or acquire data. The UDR 130h performs a function to store subscription information of the UE 120, store policy information, store data exposed to the outside, or store information for a 3rd party application. The UDR 130h also performs a function to provide the stored data to another NF.

The UDM 130f, the PCF 130d, the SMF 130b, the AMF 130a, the NRF 130e, the NEF 130g, and the UDR 130h may be connected via service-based interfaces, and may exchange control messages by allowing other NFs to use services or Application Program Interfaces (APIs) provided by the respective NFs. The NFs define services provided thereby, which are defined in the standard as Nudm, Npcf, Nsmf, Namf, Nnrf, Nnef, Nudr, and the like. For example, when the AMF 130a transmits a session-related message to the SMF 130b, an API of a service of Nsmf_PDUSession_CreateSMContext may be used.

Figure 2:
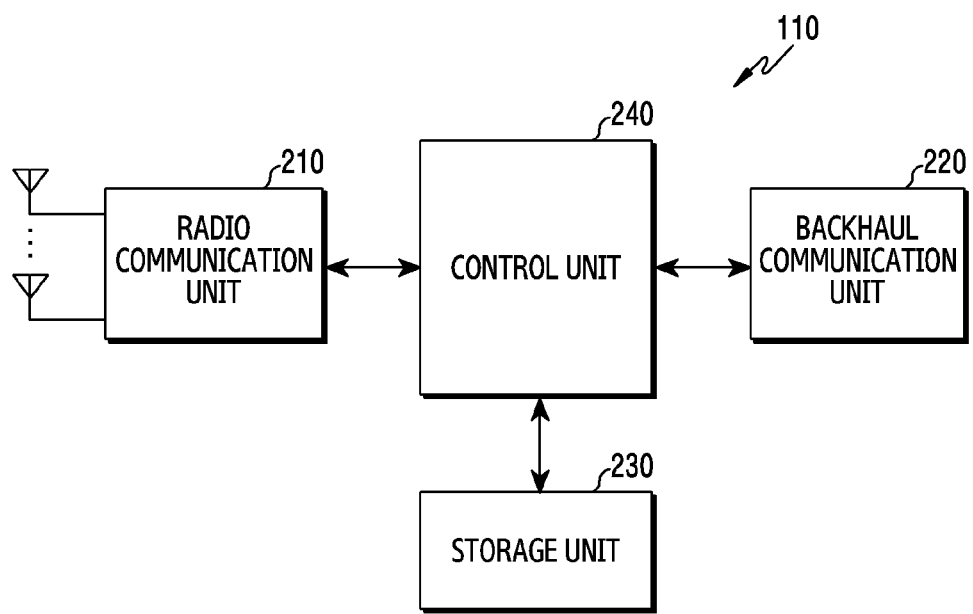
FIG. 2 illustrates a configuration of a base station in the mobile communication system according to various embodiments.

FIG. 2 illustrates a configuration of a base station in the mobile communication system according to various embodiments. The configuration illustrated in FIG. 2 may be understood as a configuration of the base station 110. The term "-unit" or "-er" used hereinafter may refer to a unit for processing at least one function or operation and may be implemented in hardware, software, or a combination of hardware and software.

Referring to FIG. 2, the base station 110 includes a radio communication unit 210, a backhaul communication unit 220, a storage unit 230, and a control unit 240.

The radio communication unit 210 performs functions to transmit or receive a signal through a radio channel. For example, the radio communication unit 210 performs a function of conversion between a baseband signal and a bit stream according to a physical layer standard of a system. For example, when data is transmitted, the radio communication unit 210 generates complex symbols by encoding and modulating a transmission bit stream. Also, when data is received, the radio communication unit 210 restores a reception bit stream by demodulating and decoding a baseband signal.

Also, the radio communication unit 210 up-converts a baseband signal into an RF band signal and transmits the same through an antenna, and down-converts an RF band signal received through an antenna into a baseband signal. To this end, the radio communication unit 210 may include a transmission filter, a reception filter, an amplifier, a mixer, an oscillator, a Digital-to-Analog Convertor (DAC), an Analog-to-Digital Convertor (ADC), and the like. Also, the radio communication unit 210 may include multiple transmission/reception paths. Further, the radio communication unit 210 may include at least one antenna array including multiple antenna elements.

In terms of hardware, the radio communication unit 210 may include a digital unit and an analog unit, wherein the analog unit includes multiple sub-units according to an operating power, an operating frequency, and the like. The digital unit may be implemented as at least one processor (e.g., a Digital Signal Processor (DSP)).

The radio communication unit 210 transmits and receives a signal as described above. Accordingly, all or a part of the radio communication unit 210 may be referred to as a "transmission unit", a "reception unit", or a "transmission/reception unit". Transmission and reception performed through a radio channel, which will be described in the following descriptions, may be understood to mean that the above-described processing is performed by the radio communication unit 210.

The backhaul communication unit 220 provides an interface for performing communication with other nodes within the network. That is, the backhaul communication unit 220 converts, into a physical signal, a bit stream transmitted from a base station to another node, for example, another access node, another base station, an upper node, the core network, etc., and converts a physical signal received from another node into a bit stream.

The storage unit 230 may store data, such as a basic program for operation of a base station, an application program, configuration information, and the like. The storage unit 230 may include a volatile memory, a non-volatile memory, or a combination of a volatile memory and a non-volatile memory. The storage unit 230 provides stored data in response to a request of the control unit 240.

The control unit 240 controls overall operations of the base station. For example, the control unit 240 transmits and receives a signal via the radio communication unit 210 or the backhaul communication unit 220. Further, the control unit 240 records data in the storage unit 230 and reads the recorded data. The control unit 240 may perform functions of a protocol stack required by the communication standard. According to another implementation, the processor stack may be included in the radio communication unit 210. To this end, the control unit 2h240 may include at least one processor. According to various embodiments, the control unit 240 may control the base station to perform operations described below.

Figure 3:
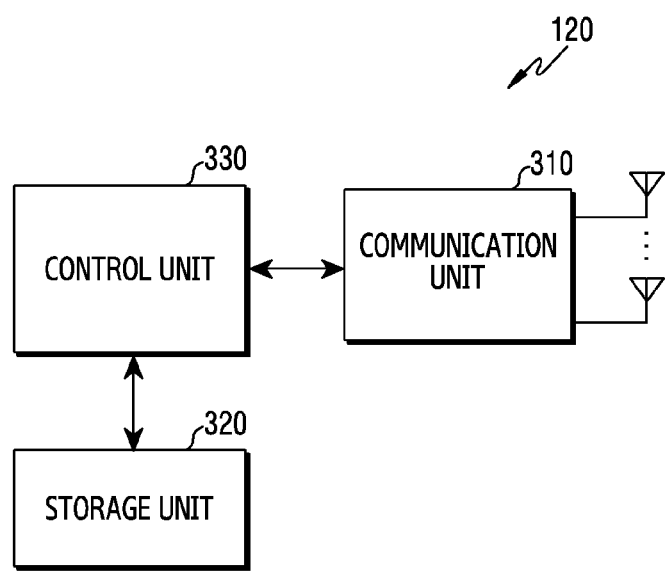
FIG. 3 illustrates a configuration of a UE in the mobile communication system according to various embodiments.

FIG. 3 illustrates a configuration of a UE in the mobile communication system according to various embodiments. The configuration illustrated in FIG. 3 may be understood as a configuration of the UE 120. The term "-unit" or "-er" used hereinafter may refer to a unit for processing at least one function or operation and may be implemented in hardware, software, or a combination of hardware and software.

Referring to FIG. 3, the UE 120 includes a communication unit 310, a storage unit 320, and a control unit 330.

The communication unit 310 performs functions for transmitting or receiving a signal through a wireless channel. For example, the communication unit 310 performs a function of conversion between a baseband signal and a bit stream according to a physical layer standard of a system. For example, when data is transmitted, the communication unit 310 generates complex symbols by encoding and modulating a transmission bit stream. Also, when data is received, the communication unit 310 restores a reception bit stream by demodulating and decoding a baseband signal. Also, the communication unit 310 up-converts a baseband signal into an RF band signal and transmits the same through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package. The communication unit 310 may include a plurality of RF chains. Further, the communication unit 310 may perform beamforming.

The communication unit 310 transmits and receives a signal as described above. Accordingly, all or a part of the communication unit 310 may be referred to as "a transmission unit", "a reception unit", or "a transmission/reception unit". Also, transmission and reception performed through a wireless channel, which will be described in the following descriptions, may be understood to mean that the above-described processing is performed by the communication unit 310.

The storage unit 320 may store data, such as a basic program for operation of a UE, an application program, configuration information, and the like. The storage unit 320 may include a volatile memory, a non-volatile memory, or a combination of a volatile memory and a non-volatile memory. The storage unit 320 provides stored data in response to a request of the control unit 330.

The control unit 330 controls overall operations of the UE. For example, the control unit 330 transmits and receives a signal via the communication unit 310. Further, the control unit 330 records data in the storage unit 320 and reads the recorded data. The control unit 330 may perform functions of a protocol stack required by the communication standard. To this end, the control unit 330 may include at least one processor or a micro-processor, or may be a part of a processor. A part of the communication unit 310 and the control unit 330 may be referred to as a communication processor (CP). According to various embodiments, the control unit 330 may control the UE to perform operations described below.

Figure 4:
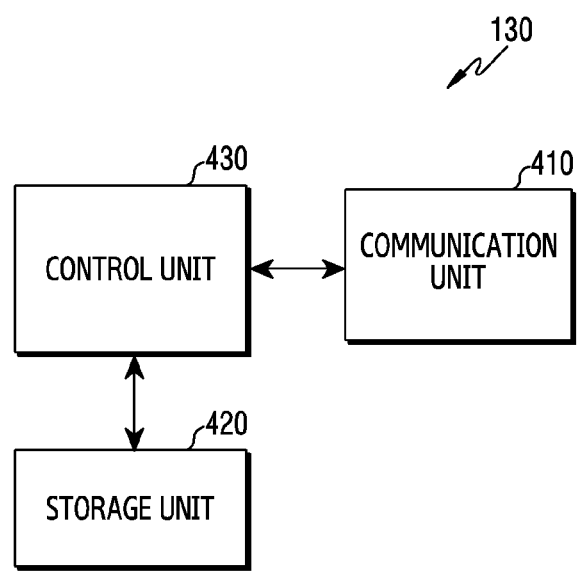
FIG. 4 illustrates a configuration of a core network object in the mobile communication system according to various embodiments.

FIG. 4 illustrates a configuration 130 of a core network object in the mobile communication system according to various embodiments. The configuration 130 illustrated in FIG. 4 may be understood as a configuration of a device having at least one function among the AMF 130a, the SMF 130b, the UPF 130c, the PCF 130d, the NRF 130e, the UDM 130f, the NEF 130g, and the UDR 130h in FIG. 1. The term "-unit" or "-er" used hereinafter may refer to a unit for processing at least one function or operation and may be implemented in hardware, software, or a combination of hardware and software.

Referring to FIG. 4, a core network object includes a communication unit 410, a storage unit 420, and a control unit 430.

The communication unit 410 provides an interface to perform communication with other devices within the network. That is, the communication unit 410 converts, into a physical signal, a bit stream transmitted from the core network object to another device, and converts a physical signal received from another device into a bit stream. That is, the communication unit 410 may transmit or receive a signal. Accordingly, the communication unit 410 may be referred to as a modem, a transmitter, a receiver, or a transceiver. The communication unit 410 enables the core network object to communicate with other devices or systems via a network or a backhaul connection (e.g., a wired backhaul or a radio backhaul).

The storage unit 420 stores data, such as configuration information, an application program, and a basic program for an operation of the core network object. The storage unit 420 may include a volatile memory, a non-volatile memory, or a combination of a volatile memory and a non-volatile memory. The storage unit 420 provides stored data in response to a request of the control unit 430.

The control unit 430 controls overall operations of the core network object. For example, the control unit 430 transmits and receives a signal via the communication unit 410. Further, the control unit 430 records data in the storage unit 420 and reads the recorded data. To this end, the control unit 430 may include at least one processor. According to various embodiments, the control unit 430 may control the core network object to perform operations described below.

In the following description of the various embodiments, the disclosure is mainly applied to a radio access network (NRC), a new radio (NR) that is a core network, and a packet core (a 5G system, a 5G core network, or an NG core) defined by the 5G network standard of 3GPP. However, various embodiments described below can be also applied to other communication systems having similar technical backgrounds with a slight variation within the scope that does not depart from the scope of the disclosure, and can be derived according to determination by those skilled in the art.

The disclosure describes a UE radio capability and a representative representation method of expressing the radio capability. The UE radio capability refers to various capabilities including a radio technology, a frequency band, or a combination thereof, which are compatible with the UE. Because the radio capability that the UE has may include multiple radio technologies, multiple frequency bands, a combination the frequency bands, or a set of the described capabilities, the representative representation method of the radio capability refers to expressing various radio capabilities with one representative representation. For convenience of description, the representative representation of various radio capabilities is referred to as a "radio capability identifier". However, the representative representation refers to a representative representation method that may refer to a set of various radio capabilities that the UE has. The radio capability ID may be an ID assigned by a UE manufacturer or an ID assigned by a PLMN service provider. The ID may be a hash value generated by an IMEI of the UE or UE identification information within a service provider.

In the description below, a set of radio capabilities that the UE has may be referred to as a "UE radio capability". Mapping between the UE radio capability and the radio capability ID that is a representative representation method thereof may be referred to as associated between the radio capability and the radio capability ID. A radio capability corresponding to the radio capability ID may be identified using the association and, similarly, a corresponding radio capability ID may be identified on the basis of the radio capability.

Figure 5:
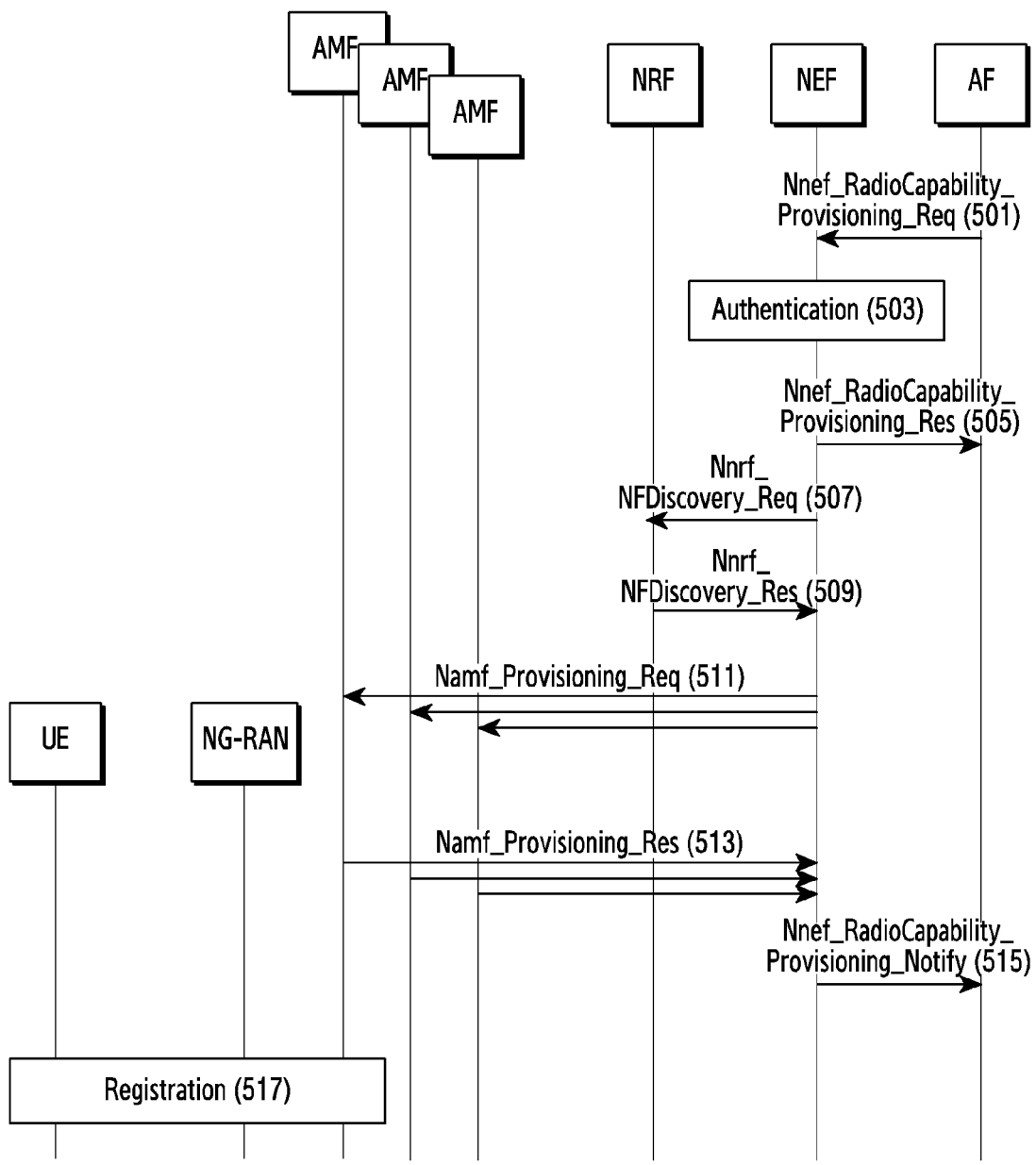
FIG. 5 illustrates a method of providing a radio capability and representative representation information therefor to a 5G mobile communication system by a server operated by a UE manufacturer according to an embodiment.

First Embodiment—FIG. 5

A first embodiment is based on FIG. 5.

The Application Function (AF) in FIG. 5 refers to an application function operated by a UE manufacturer or a PLMN service provider. Alternatively, although the AF is operated by other than a UE manufacturer, the AF may refer to other application functions to manage a UE radio capability and a radio capability ID.

The UE manufacturer knows a UE radio capability when the UE is newly released or knows a radio capability of a UE having already been released. The UE manufacturer may determine, using a method based on the 3GPP standard, a radio capability ID capable of representing the information, and may configure the same to the UE. In the case of a UE having already been released, because a specific radio capability may be prevented from being used, via a software update, a radio capability ID other than a previously configured radio capability ID may be required. As a result, the UE created by the UE manufacturer is configured by a radio capability ID configured by the UE manufacturer, and makes an attempt to access the mobile communication system by using the radio capability ID.

When the UE manufacturer newly releases a UE, the UE manufacturer may contract, in advance, with a mobile communication company, via which the UE is to be released. Therefore, the mobile communication company may authorize a server operated by the UE manufacturer to provide its own mobile communication network with a UE radio capability and a radio capability ID therefor. Because one UE may switch and use multiple mobile communication service providers, the UE manufacturer may contract with multiple mobile communication service providers, as described above. Alternatively, the UE manufacturer may have access to a third-party vendor that is authorized to serve as a radio capability provider with mobile communication service providers around the world. As described above, the AF of the embodiment may refer to a server operated by the UE manufacturer or a server authorized to provide the UE radio capability to the mobile communication service provider.

The AF in the embodiment may be a kind of a network function operated by the PLMN service provider. That is, the AF may correspond to a network function that may store a UE's radio capability and radio capability ID, may assign the radio capability ID, or may manage (generate/delete/modify) the radio capability ID. Therefore, the AF of the embodiment is not limited to the name AF and covers a network function including a function enabling storage of a UE radio capability and a radio capability ID, assignment of the radio capability ID, or management (generation/deletion/modification) of the radio capability ID. In terms of which the AF of the embodiment is a network function including a function enabling storage of a UE radio capability and a radio capability ID, assignment of the radio capability ID, or management (generation/deletion/modification) of the radio capability ID, the AF may be replaced with a UE Radio Capability Management Function (UCMF) defined in 3GPP.

According to step 501, the AF transfers a UE radio capability and a radio capability ID therefor via an NEF. A message may include association between multiple radio capability IDs and radio capabilities. That is, the message may transfer a radio capability of one UE type and a radio capability ID, and may transfer multiple radio capabilities and radio capability IDs thereof for respective multiple UE types. To this end, an API provided by the NEF may be used. Further, in the embodiment, this API is referred to as an Nnef_RadioCapability_Provisioning Request message, for convenience. This represents a message that transfers association configured by the radio capability and the radio capability ID therefor to the NEF. The message may include UE manufacturer information, or may include information enabling the mobile communication company to authorize/approve a corresponding UE manufacturer.

The NEF having received the message determines whether the AF having transferred the message in step 501 is an authorized AF. If any AF transfers a radio capability, wrong information may be provided to a mobile communication system, and therefore the NEF checks the message of step 501 and determines whether the message is transferred from an authorized AF or determines which manufacturer has transferred the message. Therefore, according to step 503, the NEF checks authentication/approval information or UE manufacturer information provided in step 501, and determines whether to accept the request of the message in step 501. The NEF may include, in advance, the information for performing authentication/approval.

The NEF having accepted the request transfers, to the AF, a response that the request has been accepted, in step 505. This response is a response to the message of step 501, and may be referred to as Nnef_RadioCapability_Provisioning Response. The AF having received the response message may confirm that the UE radio capability and the radio capability ID therefor, which are to be provided thereby, have properly been transferred to the corresponding mobile communication network.

The NEF initiates an operation for providing the NF of the mobile communication network with the UE radio capability and the radio capability ID therefor, which are acquired in step 501. If the mobile communication system uses a UDR, the NEF may store, in the UDR, the radio capability and the radio capability ID which are received from the AF. This is based on embodiment 3 of the disclosure.

The NEF acquires addresses of the NFs in order to provide association between the radio capability and the radio capability ID therefor to the NF of the 5G mobile communication system. Therefore, the NEF transfers the message to the NRF in step 507. In the disclosure, providing an AMF with a radio capability and a radio capability ID by the NEF is used as a representative example. The NEF may also transfer the information to another NF within the 5G system. The NEF communicates with the NRF to discover an NF to which the NEF itself is to transfer the radio capability and radio capability ID. As in step 507, the NEF uses an Nnrf_NFDiscovery_Request service. The NEF includes, in the message, an NF type that the NEF itself desires to discover. Alternatively, the message may include a service operation name of a target NF. In this case, as Namf_Provisioning_Request in step 511, a service operation name for providing specific information to a particular NF (e.g., the AMF) may be referred. The NEF may include an identifier indicating that all AMF information within a Public Land Mobile Network (PLMN) is desired.

According to step 509, the NRF includes and transfers an IP address of the NF, an FQDN, or the service operation name in response to the request in step 507. According to an example, the NRF may include the FQDN or the IP address of the AMF, and a service operation name enabling radio capability information to be further provided to the AMF. The NRF may respond including information of all AMFs within the PLMN.

The NEF may determine, on the basis of the received information, the AMFs to provide radio capabilities and radio capability IDs. If the NEF has received the service operation name for providing information in step 509, the NEF transfers the message of step 511 by using the name. In the disclosure, Namf_Provisioning_Request refers to a service operation that provides specific information to the AMF. The message of step 511 may be concurrently transferred to multiple AMFs. Further, the message of step 511 may include the radio capability and the radio capability ID received by the NEF from the AF. When association between multiple radio capabilities and radio capability IDs are present, the NEF may include all multiple pieces of information in the message of step 511.

The AMF having received the message of step 511 stores the association between the radio capabilities and the radio capability IDs. Therefore, when the UE transfers the radio capability IDs, the AMF may determine the UE radio capabilities corresponding to the radio capability IDs. Alternatively, if the UE has transferred the entire set of the radio capabilities, the radio capability IDs corresponding thereto may be determined. If the received information overlaps with information that the AMF already has, the AMF may update existing information with the newly received information. Alternatively, the AMF may recognize this situation as an error, and may perform a response thereto in step 513.

The AMF may transfer, via an N2 interface, this information to an NG-RAN connected thereto. If the radio capability and the radio capability ID information therefor are transferred to the NG-RAN via an N2 message, the NG-RAN stores this information, and may use the same when the UE accesses a radio resource. For example, the UE may determine a corresponding UE radio capability by checking the radio capability ID transferred in an RRC message. Further, the UE may apply an RRC operation according thereto.

Thereafter, as shown in step 513, the AMF transfers, to the NEF, a response to step 511. This is referred to as Namf_Provisioning_Response for convenience, but refers to a response operation to a service operation in which the NEF has transferred the radio capability and the radio capability ID to the AMF. In step 513, the AMF may indicate an error situation as follows. For example, if the newly received radio capability ID corresponds to the previously existing radio capability ID, a notification of data duplication may be provided in step 513. Alternatively, when different radio capability IDs are assigned to a set of the same radio capabilities, a notification thereof may be transferred in step 513. Here, the AMF may include a cause of the error situation and the radio capability or the radio capability ID, in which the cause has occurred.

The NEF may determine in step 513 that the radio capability and the radio capability ID therefor have successfully been provided. If the notification of the error situation and information thereof are received in step 513, the NEF may notify of the information to the AF in step 515. The AF may assign a new radio capability ID accordingly, and then may perform step 501 again.

The AMF, which stores the UE radio capability and the radio capability ID therefor via procedures above, may use the same at a later time when the UE performs a registration procedure as shown in step 517. If the UE transfers a registration request including the radio capability ID, the AMF may discover a corresponding radio capability, may include this information in an N2 message transferred to a base station in order to transfer a registration accept message, and may inform the base station of the N2 message. The base station may determine the UE radio capability by using this information, and may provide a corresponding RRC function. Alternatively, if the base station has already received, from the AMF, the radio capability and the radio capability ID therefor, the base station may determine the radio capability therefor by checking the radio capability ID information transferred by the UE.

The NEF may continuously store AMF address information obtained in step 507 and step 509. Therefore, when the AF additionally transfers the radio capability and the radio capability ID therefor, step 511 may proceed using the stored AMF address information. As another method, the NEF may perform a service operation referred to as an NFstatus subscription, for the NRF. This corresponds to performing a function of informing the NEF of a corresponding NF address and service operation by the NRF, when there is a newly added NF. For example, if an AMF in the network is newly added, the NRF informs the NEF of the address and service operations of the newly added AMF. The NEF may update a list of stored AMFs by using this information, and may perform step 511 by using the list of AMFs when the request as shown in step 501 has been received.

The AMF of the embodiment is a network function included in a 5G system. This may correspond to an MME of a 4G system (Evolved Packet System; EPS). Therefore, the AMF of the embodiment according to FIG. 5 may be replaced by an MME in order to operate in the 4G system. Likewise, the NEF may correspond to a Service Capability Exposure Function (SCEF) in the 4G system, and the NEF of the embodiment may be replaced by the SCEF in order to operate in the 4G system.

Figure 6:
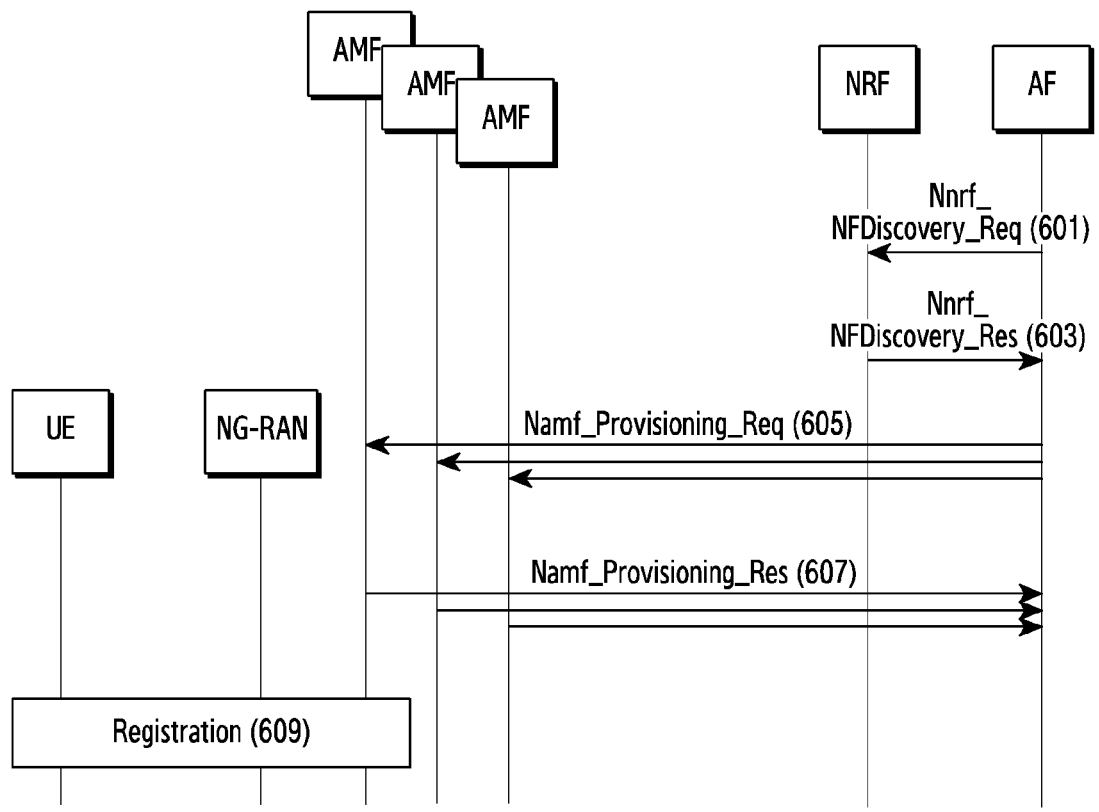
FIG. 6 illustrates a method of providing a radio capability and representative representation information therefor to a 5G mobile communication system by a server operated by a mobile communication service provider according to an embodiment.

Second Embodiment—FIG. 6

A second embodiment is based on FIG. 6.

The AF of FIG. 6 refers to an application function operated by a mobile communication service provider. Alternatively, the AF may refer to an application function that allows the mobile communication service provider to access its own mobile communication network. That is, the AF may be an application function allowed to communicate with NFs without accessing NEFs. The AF may be an application function connected to multiple UE manufacturer servers so as to receive and store a radio capability and a radio capability ID therefor from a corresponding UE manufacturer server. The AF in the embodiment may be a kind of a network function operated by the PLMN service provider. That is, the AF may correspond to a network function that may store a UE's radio capability and radio capability ID, may assign the radio capability ID, or may manage (generate/delete/modify) the radio capability ID. Therefore, the AF of the embodiment is not limited to the name AF and covers a network function including a function enabling storage of a UE radio capability and a radio capability ID, assignment of the radio capability ID, or management (generation/deletion/modification) of the radio capability ID. In terms of which the AF of the embodiment is a network function including a function enabling storage of a UE radio capability and a radio capability ID, assignment of the radio capability ID, or management (generation/deletion/modification) of the radio capability ID, the AF may be replaced with a UE Radio Capability Management Function (UCMF) defined in 3GPP.

The UE manufacturer knows a UE radio capability when the UE is newly released or knows a radio capability of a UE having already been released. The UE manufacturer may determine, using a method based on the 3GPP standard, a radio capability ID capable of representing the information, and may configure the same to the UE. In the case of a UE having already been released, because a specific radio capability may be prevented from being used, via a software update, a radio capability ID other than a previously configured radio capability ID may be required. As a result, the UE created by the UE manufacturer is configured by a radio capability ID configured by the UE manufacturer, and makes an attempt to access the mobile communication system by using the radio capability ID.

When the UE manufacturer newly releases a UE, the UE manufacturer may contract, in advance, with a mobile communication company, via which the UE is to be released. Therefore, the mobile communication company may authorize a specific application function to provide its own mobile communication network with a UE radio capability and a radio capability ID therefor. The application function may be operated by the mobile communication service provider, or may be an application function authorized to communicate with another NF by being able to access the inside of the mobile communication system.

According to step 601, the AF first acquires addresses of the NFs in order to provide association between the radio capability and the radio capability ID therefor to the NF of the 5G mobile communication system. Therefore, the AF transfers a message to the NRF in step 601. In the disclosure, providing an AMF with a radio capability and a radio capability ID by the AF is used as a representative example. The AF may also transfer the information to another NF within the 5G system. The AF communicates with the NRF to discover an NF to which the AF itself is to transfer the radio capability and radio capability ID. As shown in step 601, the AF may use an Nnrf_NFDiscovery_Request message. The AF includes, in the message, an NF type that the AF itself desires to discover. Alternatively, the message may include a service operation name of a target NF. In this case, as Namf_Provisioning_Request in step 605, a service operation name for providing specific information to a particular NF (e.g., the AMF) may be referred. The AF may include an identifier indicating that all AMF information within a PLMN is desired.

According to step 603, the NRF includes and transfers an IP address of the NF, an FQDN, or the service operation name in response to the request in step 607. According to an example, the NRF may include the FQDN or the IP address of the AMF, and a service operation name enabling radio capability information to be further provided to the AMF. The NRF may respond including information of all AMFs within the PLMN.

The AF may determine, on the basis of the received information, the AMFs used to provide radio capabilities and radio capability IDs. If the NEF has received the service operation name for providing information in step 603, the NEF transfers the message of step 605 by using the name. In the disclosure, Namf_Provisioning_Request refers to a service operation that provides specific information to the AMF. The message of step 605 may be concurrently transferred to multiple AMFs. Further, the message of step 605 may include the radio capability and the radio capability ID received by the NEF from the AF. When association between multiple radio capabilities and radio capability IDs are present, the NEF may include all multiple pieces of information in the message of step 605.

The AMF having received the message of step 605 stores the association between the radio capabilities and the radio capability IDs. Therefore, when the UE transfers the radio capability IDs, the AMF may determine the UE radio capabilities corresponding to the IDs. Alternatively, if the UE has transferred the entire set of the radio capabilities, the radio capability IDs corresponding thereto may be determined. If the received information overlaps with information that the AMF already has, the AMF may update existing information with the newly received information. Alternatively, the AMF may recognize this situation as an error, and may perform a response thereto in step 607.

The AMF may transfer, via an N2 interface, this information to an NG-RAN connected thereto. If the radio capability and the radio capability ID information therefor are transferred to the NG-RAN via an N2 message, the NG-RAN stores this information, and may use the information when the UE accesses a radio resource. For example, the UE may determine a corresponding UE radio capability by checking the radio capability ID transferred in an RRC message. Further, the UE may apply an RRC operation according thereto.

Thereafter, as shown in step 607, the AMF transfers, to the AF, a response to step 605. This is referred to as Namf_Provisioning_Response for convenience, but refers to a response operation to a service operation in which the NEF has transferred the radio capability and the radio capability ID to the AMF. In step 607, the AMF may indicate an error situation as follows. For example, if the newly received radio capability ID corresponds to the previously existing radio capability ID, a notification of data duplication may be provided in step 607. Alternatively, when different radio capability IDs are assigned to a set of the same radio capabilities, a notification thereof may be transferred in step 607. Here, the AMF may include a cause of the error situation and the radio capability or the radio capability ID, in which the cause has occurred.

The AF may determine in step 607 that the radio capability and the radio capability ID therefor have successfully been provided. If a notification of the error situation and information thereof are received in step 607, the AF may assign a new radio capability ID accordingly, and then may perform step 605 again. Because the AF has already acquired a list of AMFs, the AF is not required to repeat step 601 in order to acquire addresses of the AMF again. Further, the AF may perform a service operation referred to as NFstatus subscription, for the NRF. This is a service operation for, when a new NF is added within the mobile communication system, receiving a notification of information relating thereto. Via this operation, the AF may acquire an address of the NF newly added within the network, for example, a newly added AMF, and may provide a radio capability and a radio capability ID therefor.

The AMF, which stores the UE radio capability and the radio capability ID therefor via procedures above, may use the same at a later time when the UE performs a registration procedure as shown in step 609. If the UE transfers a registration request including the radio capability ID, the AMF may discover a corresponding radio capability, may include this information in an N2 message transferred to a base station in order to transfer a registration accept message, and may inform the base station of the N2 message. The base station may determine the UE radio capability by using this information, and may provide a corresponding RRC function. Alternatively, if the base station has already received, from the AMF, the radio capability and the radio capability ID therefor, the base station may determine the radio capability therefor by checking the radio capability ID information transferred by the UE.

The AMF of the embodiment is a network function included in a 5G system. This may correspond to an MME of a 4G system (Evolved Packet System; EPS). Therefore, the AMF of the embodiment according to FIG. 5 may be replaced by an MME in order to operate in the 4G system. Likewise, the NEF may correspond to a Service Capability Exposure Function (SCEF) in the 4G system, and the NEF of the embodiment may be replaced by the SCEF in order to operate in the 4G system.

Figure 7:
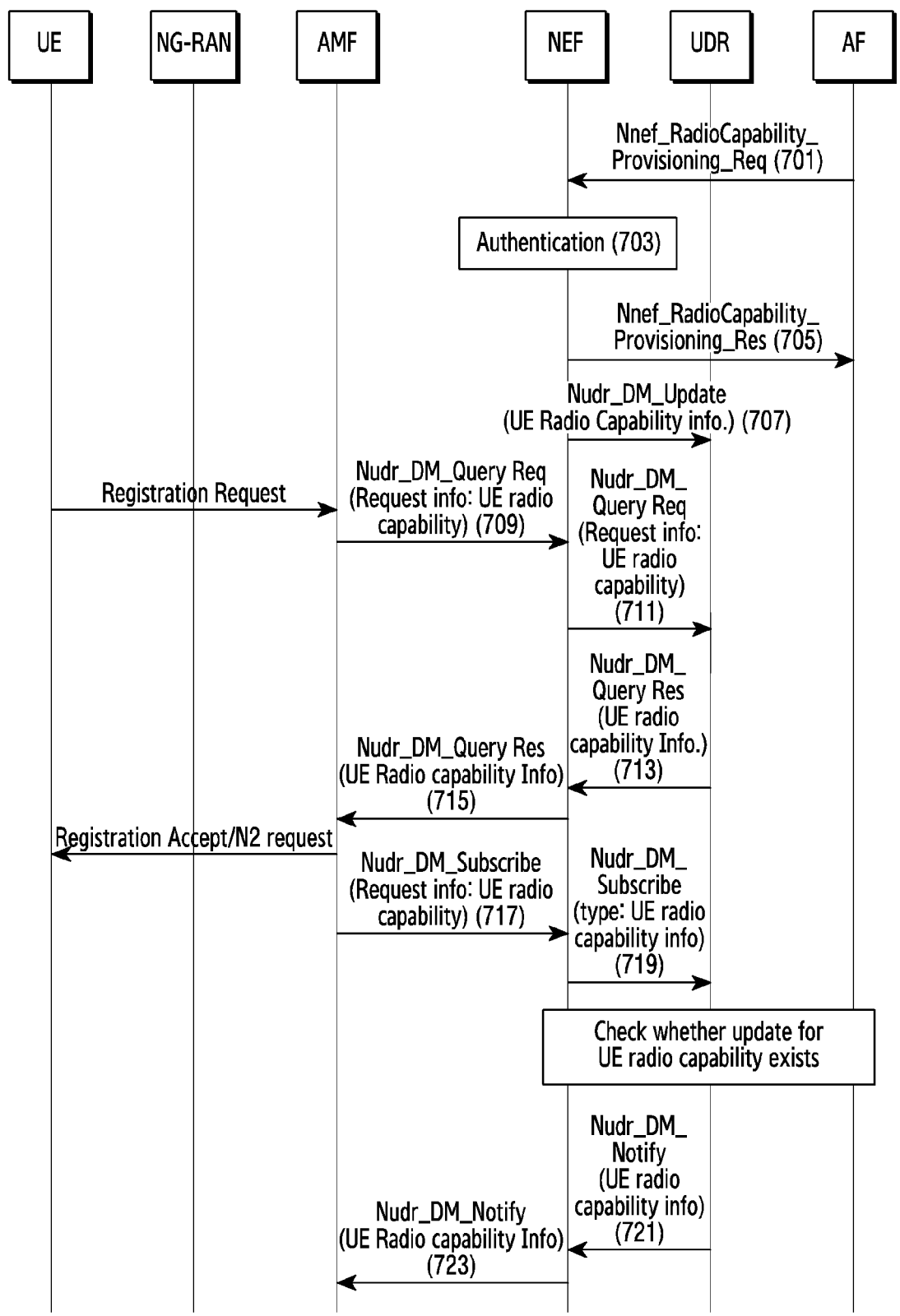
FIG. 7 illustrates a method of storing a UE radio capability and representative representation information therefor in a UDR and utilizing the same in the 5G mobile communication system according to an embodiment.

Third Embodiment—FIG. 7

A third embodiment is based on FIG. 7.

The AF of FIG. 7 refers to an application function operated by a UE manufacturer. Alternatively, although the AF is operated by other than a UE manufacturer, the AF may refer to other application functions to manage a UE radio capability and a radio capability ID. The AF may refer to as an application function directly operated by a mobile communication service provider. FIG. 7 may include a case where a mobile communication system uses a UDR. The UDR of FIG. 7 may be replaced by a network function having a function of storing a UE radio capability and a radio capability ID. In the following description, a UDR will be used as an example for convenience, but the AF may comprehensively refer to, instead of the UDR, a network function (NF) having a function to store and manage (generate/modify/delete) a radio capability and a radio capability ID, that is, a network function (NF) operated by an PLMN service provider. Therefore, the UDR of the embodiment is not limited to the name UDR and includes a network function including a function enabling storage of a UE radio capability and a radio capability ID, assignment of the radio capability ID, or management (generation/deletion/modification) of the radio capability ID. Therefore, the UDR may be replaced by a UE Radio Capability Management Function UCMF defined in the 3GPP.

According to step 701, the AF transfers a UE radio capability and a radio capability ID therefor via an NEF. A message may include association between multiple radio capability IDs and radio capabilities. That is, the message may transfer a radio capability of one UE type and a radio capability ID, and may transfer multiple radio capabilities and radio capability IDs thereof for respective multiple UE types. To this end, an API provided by the NEF may be used. Further, in the embodiment, this API is referred to as an Nnef_RadioCapability_Provisioning Request message, for convenience. This represents a message that transfers association configured by the radio capability and the radio capability ID therefor to the NEF. The message may include UE manufacturer information, or may include information enabling the mobile communication company to authorize/approve a corresponding UE manufacturer.

The NEF having received the message determines whether the AF having transferred the message in step 701 is an authorized AF. If any AF transfers a radio capability, wrong information may be provided to a mobile communication system, and therefore the NEF checks the message of step 701 and determines whether the message is transferred from an authorized AF or determines which manufacturer has transferred the message. Therefore, according to step 703, the NEF checks authentication/approval information or UE manufacturer information provided in step 701, and determine whether to accept the request of the message in step 701. The NEF may include, in advance, the information for performing authentication/approval.

The NEF having accepted the request transfers, to the AF, a response that the request has been accepted, in step 705. This response is a response to the message of step 701, and may be referred to as Nnef_RadioCapability_Provisioning Response. The AF having received the response may confirm that the UE radio capability and the radio capability ID therefor, which are to be provided thereby, have properly been transferred to the corresponding mobile communication network.

The NEF performs, via the message of step 707, an operation for updating, to the UDR or the UCMF, the UE radio capability and the radio capability ID therefor, which are acquired in step 701. The NEF may request an update of specific information during data management performed by the UDR, via an Nudr_DM_Update service operation. Alternatively, the NEF may request an update of a radio capability information database managed by the UCMF, via an Nucmf_provisioning service operation. The NEF includes, in the message, the radio capability and the radio capability ID therefor which are received in step 701, and transmits the same. The UDR or the UCMF stores the information received from the NEF. If the information overlaps with already stored information, the stored information may be updated with the newly received information.

The UE performs a registration procedure to access the 5G mobile communication system. The UE includes the radio capability ID in a registration request and transfers the same. The radio capability ID may be a value preconfigured by the UE manufacturer, or may be a value preconfigured by the mobile communication service provider, or information included in a USIM. The AMF having received the registration request performs an operation of discovering a radio capability corresponding to the radio capability ID included in a registration request message. If no radio capability information for the radio capability ID transferred by the UE is present in the AMF, the AMF starts an operation of step 709 in order to acquire the radio capability for the radio capability ID. The AMF transfers a request for acquiring information of the radio capability to the UDR or the UCMF, as shown in step 709. The AMF may include an indicator, i.e., a request for the radio capability information, for example, radio capability ID information, in an Nudr_DM_query request transferred to the UDR or an Nucmf_radio-capability_resolve request transferred to the UCMF, in order to make a request. The AMF may include version information of "the radio capabilities and information of the radio capability IDs" held thereby. The AMF may display a version of most recently provided information. This version information may be used to determine whether to transfer information updated by only the UDR or the UCMF, or to transfer all information on radio capabilities of all types of UEs. The version information may be Timestamp indicating a time at which corresponding data has been provided. That is, the AMF may manage, as Timestamp information, the time at which the corresponding data has been provided and stored with respect to information of most recently provided and stored radio capabilities. Due to the absence of information of the radio capability, the AMF may include an indicator that requests all information. The UDR or the UCMF having received the indicator may determine to include all information. Alternatively, it is possible to configure the UDR or the UCMF to determine to transfer all information, by excluding most recent version information from the request of step 709. The AMF may make a request including the radio capability ID received from the UE. This is to request information of a specific radio capability ID from the UDR or the UCMF, and the UDR or the UCMF may send a response with the radio capability information of the specific radio capability ID. If the AMF is able to directly access the UDR or the UCMF, the AMF transmits the message of step 709 directly to the UDR or the UCMF. If the AMF is unable to directly access the UDR or the UCMF, the AMF transmits a request to the UDR or the UCMF via an NEF. The AMF may find an address of the NEF via the NRF or may find the address by internal configuration information, and transmits the message of step 709 to the NEF. The AMF may include, in the request of step 709, indication that its own NF type is the AMF and transmit the request. Further, the AMF may inform of its own address, including an AMF ID, for reception of a response.

When the AMF transmits a query to the UDR or the UCMF via the NEF, the NEF may perform step 711 to transfer the request of the AF to the UDR or the UCMF. The NEF transfers intact the message received in step 709 to the UDR or the UCMF.

The UDR or UCMF having received the request from the AMF according to step 711, or the UDR or UCMF having received the request directly from the AMF according to step 709 transfers radio capability information in response to the request from the AMF according to step 713. The message in step 713 includes radio capabilities and a list of radio capability IDs therefor. The UDR or the UCMF may check the request transmitted by the AMF according to step 709 or step 711, and may transfer all radio capability-related information stored in the UDR or the UCMF, or the AMF may check the current version of radio capability information data held thereby, which is included in the request message and transmitted, and may determine the radio capability information further updated from the corresponding version to be transferred. Alternatively, the AMF may check most recently updated date information of the radio capability information data held thereby, which is included in the request message and transmitted, that is Timestamp, and may determine the radio capability information further updated compared to a corresponding time to be transferred. When the updated radio capability information is transferred, a smaller amount of data may be transferred compared to transferring all radio capability information. The UDR or the UCMF may specify versions for information lists and transfer the same, the information lists being for radio capabilities and radio capability IDs, which are transferred to the AMF. The version may be indicated by number or may be referred to as date or time. The version may be used to notify of information currently held by the AMF itself when the AMF requests the UDR or the UCMF to update the radio capability at a later time. As another example, when a specific radio capability ID is included in the request transmitted by the AMF, it may be determined to transfer only the radio capability ID and radio capability information therefor. If information of the radio capability ID requested by the AMF is not present in the UDR or the UCMF, the UDR or the UCMF may transfer an error indicating that no data corresponding to a response message is present. After the determination above, the UDR or the UCMF transmits a response according to step 713. When the request by the AMF is transferred via the NEF, the response may be transmitted to the NEF according to step 713, and because the message includes the AMF ID, the NEF may be informed of an address of a target AMF. When the request by the AMF of transferred directly to the UDR or the UCMF according to step 709, the message of step 713 may be transferred directly to the AMF identified by the AMF ID.

As another detailed embodiment, when the Nucmf_radio-capability_resolve message for requesting radio capability information for a UE radio capability ID is transferred, the AMF may transmit a request including an indicator to request to transfer all of a data set of radio capability information currently stored in the UDR or the UCMF. Alternatively, the message for requesting the radio capability information may not include the UE radio capability ID, but may include the indicator to request to transfer the data set of the radio capability information stored in the UDR or the UCMF. This is to acquire information for the AMF to local-cache the radio capability information. The UDR or UCMF having received the request may determine to transfer, to the AMF, the data set of the radio capability information stored therein, and may transfer data to the AMF via a response service operation to the request. When a data capacity is larger, the response message may be divided into multiple HTTP messages so as to be transmitted. When the request is transferred, the AMF may transfer the request further including a version of a radio capability information data set, which the AMF itself has held and is local-cached, a time value obtained by local-caching the radio capability information data, or the like. The UDR or UCMF having received the request may check the version and the time value to determine which data set is further necessary for the AMF so as to determine the most recent data set to be transferred to the AMF, and may configure corresponding data and transfer the configured data to the AMF via the response service operation.

The AMF may further include network slice information (e.g., a network slide for CIoT, etc.) in the message for requesting the radio capability information. The network slice information may be information, such as eMBB, CIoT, V2X, URLLC, etc., and may have different radio capability information according to characteristics of UEs accessing respective network slices. The UCMF having received the network slice information may determine a type of a UE using a corresponding network slice. For example, if network slice information for CIoT is included, the UCMF may determine that the AMF is an AMF supporting the CIoT network slice and, therefore, the UCMF may determine radio capability information used by CIoT UEs, and may configure a data set so as to transmit the configured data set to the AMF via a response service operation.

If the NEF has received the message of step 713, the NEF may check an AMF ID within the message so as to identify a target AMF. Alternatively, the NEF may recognize that a response to step 711 is step 713, and may identify an AMF having triggered step 711 to be performed. The NEF then transfers the response received from the UDR or the UCMF to the AMF, which follows a procedure of step 715.

The AMF having received the response directly from the UDR or the UCMF according to step 713 or having received the response of the UDR or UCMF via the NEF according to step 715 may store the received radio capability and radio capability ID information therefor. If associations between multiple radio capabilities and radio capability IDs therefor are received, all the associations are stored. If version information is included, the version information is also stored together. If a corresponding data set is included with updated time information, the data set and the updated time information are also stored. Even if the version or time information is not included, the AMF may determine a time, at which the radio capability information is received, as the most recent update time and store the same. The AMF may determine, on the basis of the stored information, a radio capability corresponding to the radio capability ID which is included in the registration request and transmitted by the UE. If the response received by the AMF from the UDR or the UCMF has an indicator indicating the absence of radio capability information corresponding to the radio capability ID transmitted by the UE, the AMF may perform another operation for processing such an error situation. For example, the AMF requests, via a UE capability match request message, a base station to transfer the entire set of UE radio capabilities, and the base station requests, on the basis thereof, the radio capability from the UE and receives the entire set of radio capabilities supported by the UE. The base station transfers the entire set of radio capabilities received from the UE, in response to the UE capability match request, and the AMF associates the information with the radio capability ID transferred by the UE. Therefore, association between the radio capability ID and the radio capability therefor is obtained and the AMF stores the obtained association.

For another method, in order to transmit, to the base station, a notification that the entire set of UE radio capabilities is to be acquired, the AMF may transfer an Initial UE Context Setup Request message to be transferred to the base station, while the message has an empty radio capability information area. Further, the AMF may omit an NAS message from the Initial UE Context Setup Request message, the NAS message being required to be transferred to the UE. This is because an NAS procedure for the UE may be completed after the radio capability information of the UE is accurately identified. The base station having received the Initial UE Context Setup Request message performs a radio procedure of requesting the UE to transfer the radio capability information. The UE transfers, to the base station, the entire set of radio capabilities supported by the UE itself. The base station configures an Initial UE Context Setup Response message in response to the Initial UE Context Setup Request, and includes, in the message, the entire set of the radio capabilities received from the UE so as to transfer the same to the AMF. The AMF having received the configured message determines whether a radio capability ID corresponding to the received entire set of radio capabilities is stored in the AMF. As another example, the radio capability ID for the entire set of the radio capabilities may be acquired by transmitting the entire set of the radio capabilities to the UDR or the UCMF. If the AMF is unable to acquire the radio capability ID corresponding to the entire set of the radio capabilities, the AMF may directly assign the radio capability ID capable of indicating the entire set of the radio capabilities. As a result, association between the radio capability ID and the entire set of the radio capabilities is obtained, and the AMF stores the obtained association. When a radio capability ID is newly assigned, the AMF may transfer the ID and the entire set of the radio capabilities to the UDR or the UCMF, so as to update information stored in the UDR or the UCMF.

In order to share the new radio capability ID with other NFs within the network, the AMF may perform an operation of updating corresponding information to the UDR and the UCMF. In this case, the AMF may transfer, to the UDR or the UCMF, the radio capability ID and the radio capability information therefor by using a service operation such as Nucmf_RadioCapability_Update, or an Nudr_DM_Update service operation. The service operation may be requested by the AMF via the NEF, or may be requested by the AMF directly to the UDR or the UCMF. When the service operation is requested via NEF, the NEF may request an update operation from the UDR or the UCMF by using the information included in the message received from the AMF. The UDR or UCMF having received the request may store the radio capability and the radio capability ID therefor. The service operation message is not limited to a service operation name, and includes the meaning of providing, by the AMF, the radio capability information to the UDR or the UCMF to perform an update.

If the AMF has successfully acquired the radio capability information for the radio capability ID transmitted by the UE from the UDR or the UCMF according to step 713 and step 715, the AMF may include this information in an N2 message, and notify the base station of the same, wherein the N2 message is transferred to the base station in order to transmit a registration accept message. The base station may determine the UE radio capability by using this information, and may provide a corresponding RRC function.

Regardless of the above procedures, the AMF may perform step 717 to perform a subscription service operation of requesting, when there is an update of the radio capability information, notification thereof from the UDR or the UCMF. To this end, a service operation of Nudr_DM_subscribe may be used, and the AMF may include, in a request message, an indicator indicating that an update of the radio capability information is desired. Alternatively, if the AMF performs the subscription service operation of requesting notification of an update of the radio capability information from the UCMF when there is the update, the AMF may use a service operation of Nucmf_UECapabilityManagement_Subscribe. This is not limited to a service operation name, but may be referred to as another name that signifies a service operation transferred in the sense of requesting notification of an update of the radio capability information when there is the update. The AMF may transmit the request directly to the UDR or the UCMF, or may transmit the request via the NEF. When the request is directly transmitted, the message of step 717 is directly transmitted to the UDR or the UCMF, and when the request is transmitted via the NEF, the message of step 717 is transferred to the NEF, and the NEF transfers the message to the UDR or the UCMF via the message of step 719. When the radio capability information is updated, the UDR or UCMF having received the message may perform an operation of informing a corresponding AMF of the updated information. As another detailed embodiment, when a subscription message is transmitted, the AMF may include version information for a radio capability information data set held thereby, information of a time at which the data set has been received, or information of a time at which the data set has been generated. Time information may be in the form of a timestamp. The UDR or UCMF having received the subscription message may determine whether the AMF stores most recent information or whether to transfer, to the AMF, information updated after a version or time indicated by the AMF, on the basis of version of the radio capability data set held by the AMF or information of the time at which the data set is generated or provided. The UDR or UCMF having received the subscription message of the AMF may configure radio capability information which may be further stored by the AMF (which may be local-cached), and may include the configured radio capability information in a notification message (step 721), so as to transfer the notification message to the AMF, on the basis of the version or time information transmitted by the AMF as described above.

As another detailed embodiment, when the subscription message is transmitted, the AMF may transmit a request including an indicator to request to transfer all of a data set of radio capability information currently stored in the UDR or the UCMF. This is to acquire information for the AMF to local-cache the radio capability information. The UDR or UCMF having received the subscription message may determine to transfer, to the AMF, the data set of the radio capability information stored therein, and may transfer data to the AMF via a notification service operation (notify). When a data capacity is larger, the notification message (notify) may be divided into multiple HTTP messages so as to be transmitted. In addition to the indicator described above, the AMF may transfer the notification message including a version of a radio capability information data set, which the AMF itself has held and is local-cached, a time value obtained by local-caching the radio capability information data, or the like. The UDR or UCMF having received the request may check the version and the time value to determine which data set is further necessary for the AMF so as to determine the most recent data set to be transferred to the AMF, and may configure corresponding data and transfer the configured data to the AMF via the notification service operation.

The AMF may further include network slice information (e.g., a network slide for CIoT, etc.) in the subscription message. The network slice information may be information, such as eMBB, CIoT, V2X, URLLC, etc., and may have different radio capability information according to characteristics of UEs accessing respective network slices. The UCMF having received the network slice information may determine a type of a UE using a corresponding network slice. For example, if network slice information for CIoT is included, the UCMF may determine that the AMF is an AMF supporting the CIoT network slice and, therefore, the UCMF may determine radio capability information used by CIoT UEs, and may configure a data set so as to transmit the configured data set to the AMF via a notification service operation (notify).

According to steps 701, 703, 705, and 707, or another method, if the radio capability information has been updated to the UDR or the UCMF, the UDR or UCMF may determine to provide the updated radio capability information to the AMF having performed step 717 or step 719. When the UDR or the UCMF is able to directly respond to the AMF, the message of step 721 of Nudr_DM_Notify or Nucmf_RadioCapability_Notify is transferred directly to the AMF. The message is not limited to a name thereof, and if the UDR or the UCMF has subscribed to the update of the radio capability information, the message may refer to a message to notify newly updated radio capability information in response to the subscription. When the UDR or the UCMF is unable to directly respond to the AMF, the UDR or the UCMF transfers the message of step 721 to the NEF, and the NEF transfers the message to the AMF via the message of step 723. The Nudr_DM_Notify message may include the radio capability updated in the UDR or the UCMF and the radio capability ID information therefor. The UDR or the UCMF may specify versions for information lists and transfer the same, the information lists being for radio capabilities and radio capability IDs, which have been stored up to the current time. The version may be indicated by number or may be referred to as a date or time at which corresponding data has been generated. The AMF stores the radio capability ID and radio capability information therefor received in step 721 or step 723. If version information is included, the version information is also stored together. If a corresponding data set is included with updated time information, the data set and the updated time information are also stored. Even if the version or time information is not included, the AMF may determine a time, at which the radio capability information is received, as the most recent update time and store the same.

The AMF of the embodiment is a network function included in a 5G system. This may correspond to an MME of a 4G system (Evolved Packet System; EPS). Therefore, the AMF of the embodiment according to FIG. 5 may be replaced by an MME in order to operate in the 4G system. Likewise, the NEF may correspond to a Service Capability Exposure Function (SCEF) in the 4G system, and the NEF of the embodiment may be replaced by the SCEF in order to operate in the 4G system. Likewise, the UCMF may also be associated with the 4G system and operated.

Figure 8:
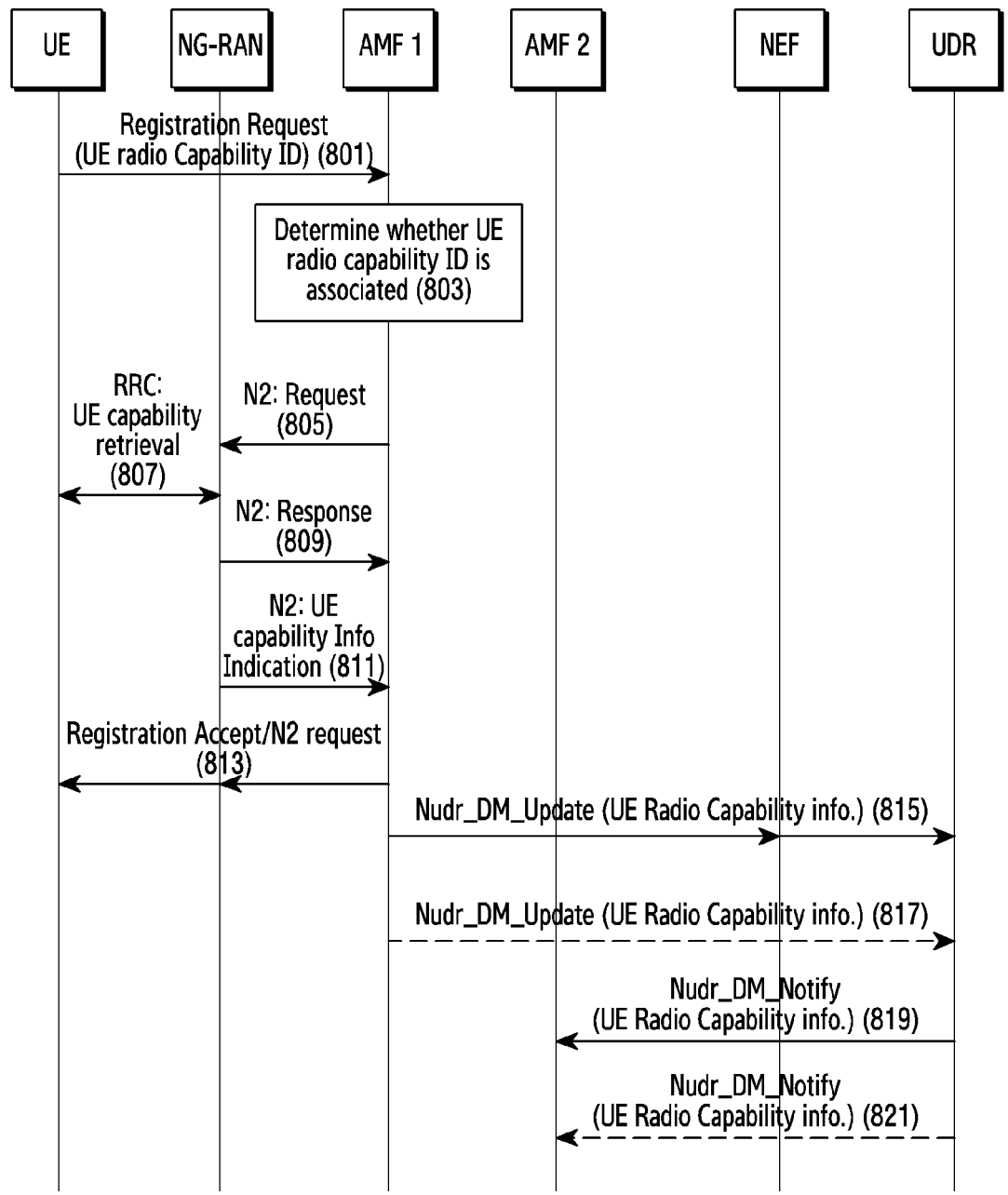
FIG. 8 illustrates a method of storing a radio capability and representative representation information therefor which are acquired from the UE and updating the same to the UDR, by an AMF according to an embodiment.

Fourth Embodiment—FIG. 8

A Fourth embodiment is based on FIG. 8.

The UDR of FIG. 8 may be replaced by a network function having a function of storing a UE radio capability and a radio capability ID. In the following description, a UDR will be used as an example for convenience, but the AF may comprehensively refer to, instead of the UDR, a network function (NF) having a function to store and manage (generate/modify/delete) a radio capability and a radio capability ID, that is, a network function (NF) operated by an PLMN service provider. Therefore, the UDR of the embodiment is not limited to the name UDR and includes a network function including a function enabling storage of a UE radio capability and a radio capability ID, assignment of the radio capability ID, or management (generation/deletion/modification) of the radio capability ID. Therefore, the UDR may be a UE Radio Capability Management Function UCMF defined in the 3GPP.

According to step 801, the UE performs a registration procedure to access the 5G mobile communication system. The UE includes the radio capability ID in a registration request and transfers the same. The radio capability ID may be a value preconfigured by the UE manufacturer, or may be a value preconfigured by the mobile communication service provider, or information included in a USIM. AMF 1 having received the registration request performs an operation of discovering a radio capability corresponding to the radio capability ID included in a registration request message, according to step 803. If no radio capability information for the radio capability ID transmitted by the UE is present in AMF 1, AMF 1 transmits, to a base station, a message for requesting a UE capability according to step 805 in order to acquire the radio capability for the radio capability ID. The base station having received the message performs an RRC procedure with the UE and acquire the UE radio capability, according to step 807. The base station may transfer, to AMF 1, the radio capability acquired from the UE via an operation of step 809 that is a response to step 805. Alternatively, after performing step 809, the base station may separately transfer the UE radio capability to AMF 1 via the message of step 811.

For another method, in order to transmit, to the base station, a notification that the entire set of UE radio capabilities is to be acquired, the AMF may transfer an Initial UE Context Setup Request message to be transferred to the base station according to step 805, while the message has an empty radio capability information area. Further, the AMF may omit an NAS message from the Initial UE Context Setup Request message, the NAS message being required to be transferred to the UE. This is because an NAS procedure for the UE may be completed after the radio capability information of the UE is accurately identified. The base station having received the Initial UE Context Setup Request message performs a radio procedure of requesting the UE to transfer the radio capability information, according to step 807. The UE transfers, to the base station, the entire set of radio capabilities supported by the UE itself. The base station configures and transfers an Initial UE Context Setup Response message according to step 809 in response to the Initial UE Context Setup Request, i.e., the message in step 805, wherein the message includes the entire set of the radio capabilities received from the UE. The AMF having received the configured message determines whether a radio capability ID corresponding to the received entire set of radio capabilities is stored in the AMF. As another example, the radio capability ID for the entire set of the radio capabilities may be acquired by transmitting the entire set of the radio capabilities to the UDR or the UCMF. If the AMF is unable to acquire the radio capability ID corresponding to the entire set of the radio capabilities, the AMF may directly assign the radio capability ID capable of indicating the entire set of the radio capabilities. As a result, association between the radio capability ID and the entire set of the radio capabilities is obtained, and the AMF stores the obtained association. When a radio capability ID is newly assigned, the AMF may transfer the ID and the entire set of the radio capabilities to the UDR or the UCMF, so as to update information stored in the UDR or the UCMF.

AMF 1 having learned the UE radio capability via step 809 or step 811 generates and stores association between the radio capability ID transmitted by the UE in step 801 and the UE radio capability acquired from step 809 or step 811. The meaning of generating the association is to have an ability to discover a corresponding radio capability by using a radio capability ID. Likewise, generating the association also means to have an ability to discover a corresponding radio capability ID by using a radio capability. If a different radio capability ID has already been assigned to the UE radio capability acquired in step 809 or step 811, the AMF may determine to provide the UE with the already assigned radio capability ID.

According to step 813, AMF 1 transmits a registration accept message to the UE. Because the message is transferred via the base station, the N2 message transferred to the base station contains the message transmitted to the UE. AMF 1 may include the UE radio capability in the N2 message transferred to the base station. Alternatively, AMF 1 may transfer the message including both the UE radio capability ID and the information of the radio capability therefor. AMF 1 may include the radio capability ID in the registration accept message of step 813. Here, the radio capability ID may have the same value as that transmitted by the UE in step 801. If AMF 1 has discovered another radio capability ID (an ID having a value different from that of the ID acquired in step 801) corresponding to the radio capability acquired from the UE, AMF 1 may include the already assigned radio capability ID in the registration accept message. The UE having performed reception in step 813 may replace an existing value with a newly received value if the UE has received a value different from that of the radio capability ID transferred by the UE itself in step 801. If no radio capability ID is included in the registration accept message of step 813, the UE may continuously use the radio capability ID used in step 801.

The AMF may determine association to be updated to the UDR or the UCMF, the association between the radio capability newly generated and stored by the AMF itself and the radio capability ID therefor. If AMF 1 is unable to access directly the UDR or the UCMF, AMF 1 performs an Nudr_DM_Update service operation via the NEF according to step 815. If the NEF has received the message, the NEF interprets reception of the message as an operation to perform an update to the UDR or the UCMF, and performs an Nudr_DM_Update procedure or an Nucmf_radiocapability_Update procedure by using, intact, the radio capability information included in the received message. This is not limited to a service operation name, and refers to an operation of updating the UE radio capability information to the UDR or the UCMF. If AMF 1 is capable of directly accessing the UDR or the UCMF and updating data, AMF 1 performs updating directly according to step 817. The service operation messages in step 815 and step 817 include association information between the radio capability, which is newly generated stored by the AMF itself via an operation continued from step 811, and the radio capability ID therefor.

The UDR or UCMF having performed reception in step 815 or step 817 stores the radio capability ID and the radio capability therefor in a storage unit. Further, because radio capability-related information has been updated, the UDR or UCMF may determine to transmit a notification to AMF 2 having previously subscribed an update of the radio capability-related information (operations corresponding to step 719 and step 721 in embodiment 3). When the UDR or the UCMF is unable to directly respond to the AMF, the UDR or the UCMF transfers the message of step 819 to the NEF, and the NEF transfers the message to AMF 2. When the UDR or the UCMF is able to directly respond to the AMF2, the UDR or the UCMF directly transfers, to the AMF, the message of step 821, a Nudr_DM_Notify or Nucmf_Radio-Capability_Notify service operation message. The Nudr_DM_Notify message may include the radio capability updated to the UDR or the UCMF and the radio capability ID information therefor. The UDR or the UCMF may specify versions for information lists and transfer the same, the information lists being for radio capabilities and radio capability IDs, which have been stored up to the current time. The version may be indicated by number or may be referred to as date. AMF 2 stores the radio capability ID and radio capability information therefor received in step 819 or step 821. If version information is included, the version information is also stored together. As a result, AMFs within the mobile communication service provider may acquire and store the most recently updated UE radio capability information.

The AMF of the embodiment is a network function included in a 5G system. This may correspond to an MME of a 4G system (Evolved Packet System; EPS). Therefore, the AMF of the embodiment according to FIG. 5 may be replaced by an MME in order to operate in the 4G system. Likewise, the NEF may correspond to a Service Capability Exposure Function (SCEF) in the 4G system, and the NEF of the embodiment may be replaced by the SCEF in order to operate in the 4G system.

As described above, the disclosure proposes a method for providing a combination of UE radio capabilities and representative representation information (i.e., identifier) referring to a combination of the UE radio capabilities to an NF of a 5G system in order to efficiently signal the UE radio capabilities. When a UE accesses a mobile communication system and informs a radio capability ID frequently used by the UE itself, the NF having learned the UR radio capability and an ID therefor may acquire a radio capability therefor. Therefore, it is not necessary to receive all of the UE radio capabilities each time from the UE, and the radio capabilities may be acquired using only the ID transferred from the UE, so as to be applied to a mobile communication service.

According to the disclosure, a server operated by a UE manufacturer may perform provisioning of a radio capability of a UE released by the server itself and representative representation information (e.g., identifier) therefor to a Network Function (NF) (e.g., AMF) of a mobile communication system. Because the UE released by a corresponding UE manufacturer uses representative representation information (e.g., identifier) for a radio capability configured by the UE manufacturer when accessing the mobile communication system, the NF (i.e., AMF) of the mobile communication system may determine, on the basis of previously provided information, which radio capability the UE uses.

According to the disclosure, with respect to a UE contracted for release to a corresponding communication company, a server directly operated by a mobile communication service provider may perform provisioning of a radio capability of the UE and representative representation information (e.g., identifier) therefor to a Network Function (NF) (e.g., AMF) of a mobile communication system. Because the UE contracted for release uses representative representation information (e.g., identifier) for a radio capability configured by the UE manufacturer when accessing the mobile communication system, the NF (i.e., AMF) of the mobile communication system may determine, on the basis of previously provided information, which radio capability the UE uses.

According to the disclosure, a UE radio capability and representative representation information (e.g., identifier) therefor may be stored in a Unified Data Repository (UDR) of a mobile communication system. For the UE radio capability and the representative representation information therefor which are stored in the UDR, when the NF (e.g., AMF) of the 5G mobile communication system does not know about representative representation information transmitted by the UE, a corresponding radio capability may be obtained by asking the UDR. Alternatively, the NF of the 5G mobile communication system may subscribe an event for a radio capability-related information update to the UDR, and may receive information thereof when new radio capability information is updated to the UDR. The NF of the 5G mobile communication system may update, to the UDR, a new UE radio capability combination and representative representation information (identifier) therefor, and the UDR may inform other NFs of the update so as to share the same information.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a network node in a wireless communication system, the method comprising:
    receiving, from an application function (AF) via a network exposure function (NEF), user equipment (UE) radio capability information on UE radio capability identifier (ID) and at least one UE radio capability mapping to the UE radio capability ID;
    receiving, from an access and mobility management function (AMF), a request for information on at least one UE radio capability mapping to a specific UE radio capability ID; and
    transmitting, to the AMF, the information on the at least one UE radio capability mapping to the specific UE radio capability ID,
    wherein the network node is a UE radio capability management function (UCMF) that stores mappings of all UE radio capability IDs in a public land mobile network (PLMN), and assigns every PLMN-assigned UE radio capability ID in the PLMN, and
    wherein the request for the information on the at least one UE radio capability mapping to the specific UE radio capability ID comprises a request for all of UE radio capability information currently stored in the network node.

2. The method of claim 1,
    wherein the UE radio capability ID represents the at least one UE radio capability mapping to the UE radio capability ID.

3. The method of claim 1,
    wherein the UE radio capability ID is UE manufacturer assigned or public land mobile network (PLMN)-assigned.

4. The method of claim 1,
    wherein the network node stores the UE radio capability information on the UE radio capability ID and the at least one UE radio capability mapping to the UE radio capability ID.

5. The method of claim 1, further comprising:
    receiving, from the AF via the NEF, updated UE radio capability information on UE radio capability ID and at least one UE radio capability mapping to the UE radio capability ID.

6. The method of claim 1, further comprising:
    receiving, from the AMF, a subscription message requesting notification of updated UE radio capability information; and
    transmitting, to the AMF, a notification message for the updated UE radio capability information.

7. The method of claim 1,
    wherein the request for the information on the at least one UE radio capability mapping to the specific UE radio capability ID is received from the AMF via the NEF.

8. The method of claim 1,
    wherein the request for the information on the at least one UE radio capability mapping to the specific UE radio capability ID comprises network slice information corresponding to a type of the UE.

9. A network node in a wireless communication system, the network node comprising:
    a transceiver; and
    at least one processor operably coupled to the transceiver, and configured to:
    receive, from an application function (AF) via a network exposure function (NEF), user equipment (UE) radio capability information on UE radio capability identifier (ID) and at least one UE radio capability mapping to the UE radio capability ID;
    receive, from an access and mobility management function (AMF), a request for information on at least one UE radio capability mapping to a specific UE radio capability ID; and
    transmit, to the AMF, the information on the at least one UE radio capability mapping to the specific UE radio capability ID,
    wherein the network node is a UE radio capability management function (UCMF) that stores mappings of all UE radio capability IDs in a public land mobile network (PLMN), and assigns every PLMN-assigned UE radio capability ID in the PLMN, and
    wherein the request for the information on the at least one UE radio capability mapping to the specific UE radio capability ID comprises a request for all of UE radio capability information currently stored in the network node.

10. The network node of claim 9,
    wherein the UE radio capability ID represents the at least one UE radio capability mapping to the UE radio capability ID.

11. The network node of claim 9,
    wherein the UE radio capability ID is UE manufacturer assigned or public land mobile network (PLMN)-assigned.

12. The network node of claim 9,
    further comprising a memory configured to store the UE radio capability information on the UE radio capability ID and the at least one UE radio capability mapping to the UE radio capability ID.

13. The network node of claim 9,
    wherein the at least one processor is further configured to:
    receive, from the AF via the NEF, updated UE radio capability information on UE radio capability ID and at least one UE radio capability mapping to the UE radio capability ID.

14. The network node of claim 9,
    wherein the at least one processor is further configured to:
    receive, from the AMF, a subscription message requesting notification of updated UE radio capability information; and
    transmit, to the AMF, a notification message for the updated UE radio capability information.

15. The network node of claim 9,
    wherein the request for the information on the at least one UE radio capability mapping to the specific UE radio capability ID is received from the AMF via the NEF.

16. The network node of claim 9, wherein the request for the information on the at least one UE radio capability mapping to the specific UE radio capability ID comprises network slice information corresponding to a type of the UE.

* * * * *